United States Patent
Chan et al.

(10) Patent No.: US 8,904,238 B2
(45) Date of Patent: Dec. 2, 2014

(54) SYSTEM AND METHOD FOR CAPTURING LOGGING INFORMATION

(75) Inventors: Philip Seik Poon Chan, Marrickville NSW (AU); Matthew J. Ponsford, Manly NSW (AU)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/595,420

(22) Filed: Aug. 27, 2012

(65) Prior Publication Data

US 2014/0059391 A1    Feb. 27, 2014

(51) Int. Cl.
*G06F 11/00* (2006.01)

(52) U.S. Cl.
USPC .......................................................... 714/45

(58) Field of Classification Search
CPC ............ G06F 11/3664; G06F 11/3688; G06F 11/3476; G06F 11/3636; G06F 11/3409; G06F 11/3672; G06F 2201/86
USPC ...................................................... 714/1–57
See application file for complete search history.

(56) References Cited

U.S. PATENT DOCUMENTS

| | | | |
|---|---|---|---|
| 6,769,079 B1 * | 7/2004 | Currey et al. | 714/45 |
| 6,802,067 B1 * | 10/2004 | Camp et al. | 719/315 |
| 8,032,489 B2 | 10/2011 | Villella et al. | |
| 8,069,407 B1 * | 11/2011 | Armandpour et al. | 715/234 |
| 8,112,398 B1 | 2/2012 | Hernandez | |
| 8,146,057 B1 * | 3/2012 | Michelsen | 717/124 |
| 2007/0283194 A1 * | 12/2007 | Villella et al. | 714/57 |
| 2008/0155352 A1 * | 6/2008 | Bakthavachalam et al. | 714/45 |
| 2009/0055686 A1 * | 2/2009 | Tsang | 714/33 |
| 2009/0144699 A1 | 6/2009 | Fendt et al. | |
| 2012/0005542 A1 * | 1/2012 | Petersen et al. | 714/48 |
| 2012/0330973 A1 * | 12/2012 | Ghuneim et al. | 707/748 |

* cited by examiner

*Primary Examiner* — Nadeem Iqbal (74) *Attorney, Agent, or Firm* — Holland & Knight LLP; Brian J. Colandreo, Esq.; Jeffrey T. Placker, Esq.

(57) ABSTRACT

A method, computer program product, and computer system for receiving, by a processor, an initiation indication that a test is initiating on a computing device. A logging process is activated to record to a log one or more log messages generated as a result of the test in response to receiving the initiation indication that the test is initiating. A completion indication is received that the test is complete. The logging process is deactivated to stop recording to the log in response to receiving the completion indication that the test is complete. The one or more log messages are associated with the test in response to receiving the completion indication that the test is complete.

21 Claims, 6 Drawing Sheets

SYSTEM AND METHOD FOR CAPTURING LOGGING INFORMATION

TECHNICAL FIELD

This disclosure relates to information logging systems and methods.

BACKGROUND

Recording events that take place on a computing device may be accomplished by, e.g., using log files. Log files may be a tool used for, e.g., diagnosing problems with one or more components of the computing device, such as applications that may be running on the computing device. When a problem is detected, a person (e.g., system administrator) may attempt to review the log to find the appropriate section where the problem may have occurred so that a solution may be developed.

However, finding the appropriate section of the logs may be arduous and time consuming, especially if the administrator is not familiar with the technical internals of, e.g., the product code, or when multiple tests have been run on the same computing device. As a result, productivity may be lost, since, e.g., the wrong section of the logs may be provided to a development team that is tasked to remedy the problem, and the developers may spend substantial amounts of time finding the correct section of the logs before they can start their analysis.

A technique that may be used to address the cumbersome task of finding the appropriate section of the logs may be to enhance the application being tested to have it dynamically control the location to which log messages are written. However, the technique may have a substantial impact on the application product code. Additionally, the technique may also result in a failure to record all of the appropriate log messages, and may also introduce a divergence from regular product code.

SUMMARY OF DISCLOSURE

In one implementation, a method, performed by one or more computing devices, comprises receiving, by a processor, an initiation indication that a test is initiating on a computing device. A logging process is activated to record to a log one or more log messages generated as a result of the test in response to receiving the initiation indication that the test is initiating. A completion indication is received that the test is complete. The logging process is deactivated to stop recording to the log in response to receiving the completion indication that the test is complete. The one or more log messages are associated with the test in response to receiving the completion indication that the test is complete.

One or more of the following features may be included. Associating the one or more log messages with the test may include renaming the log. Associating the one or more log messages with the test may include copying the log. Associating the one or more log messages with the test may include transferring the log. Only the one or more log messages generated as a result of the test may be recorded to the log. The logging process may be one or more of activated and deactivated by a plugin. The plugin may include a browser plugin.

In another implementation, a computer program product resides on a computer readable storage medium that has a plurality of instructions stored on it. When executed by a processor, the instructions cause the processor to perform operations comprising receiving, by a processor, an initiation indication that a test is initiating on a computing device. A logging process is activated to record to a log one or more log messages generated as a result of the test in response to receiving the initiation indication that the test is initiating. A completion indication is received that the test is complete. The logging process is deactivated to stop recording to the log in response to receiving the completion indication that the test is complete. The one or more log messages are associated with the test in response to receiving the completion indication that the test is complete.

One or more of the following features may be included. Associating the one or more log messages with the test may include renaming the log. Associating the one or more log messages with the test may include copying the log. Associating the one or more log messages with the test may include transferring the log. Only the one or more log messages generated as a result of the test may be recorded to the log. The logging process may be one or more of activated and deactivated by a plugin. The plugin may include a browser plugin.

In another implementation, a computing system includes a processor and memory configured to perform operations comprising receiving, by a processor, an initiation indication that a test is initiating on a computing device. A logging process is activated to record to a log one or more log messages generated as a result of the test in response to receiving the initiation indication that the test is initiating. A completion indication is received that the test is complete. The logging process is deactivated to stop recording to the log in response to receiving the completion indication that the test is complete. The one or more log messages are associated with the test in response to receiving the completion indication that the test is complete.

One or more of the following features may be included. Associating the one or more log messages with the test may include renaming the log. Associating the one or more log messages with the test may include copying the log. Associating the one or more log messages with the test may include transferring the log. Only the one or more log messages generated as a result of the test may be recorded to the log. The logging process may be one or more of activated and deactivated by a plugin. The plugin may include a browser plugin.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

System Overview

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various embodiments of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
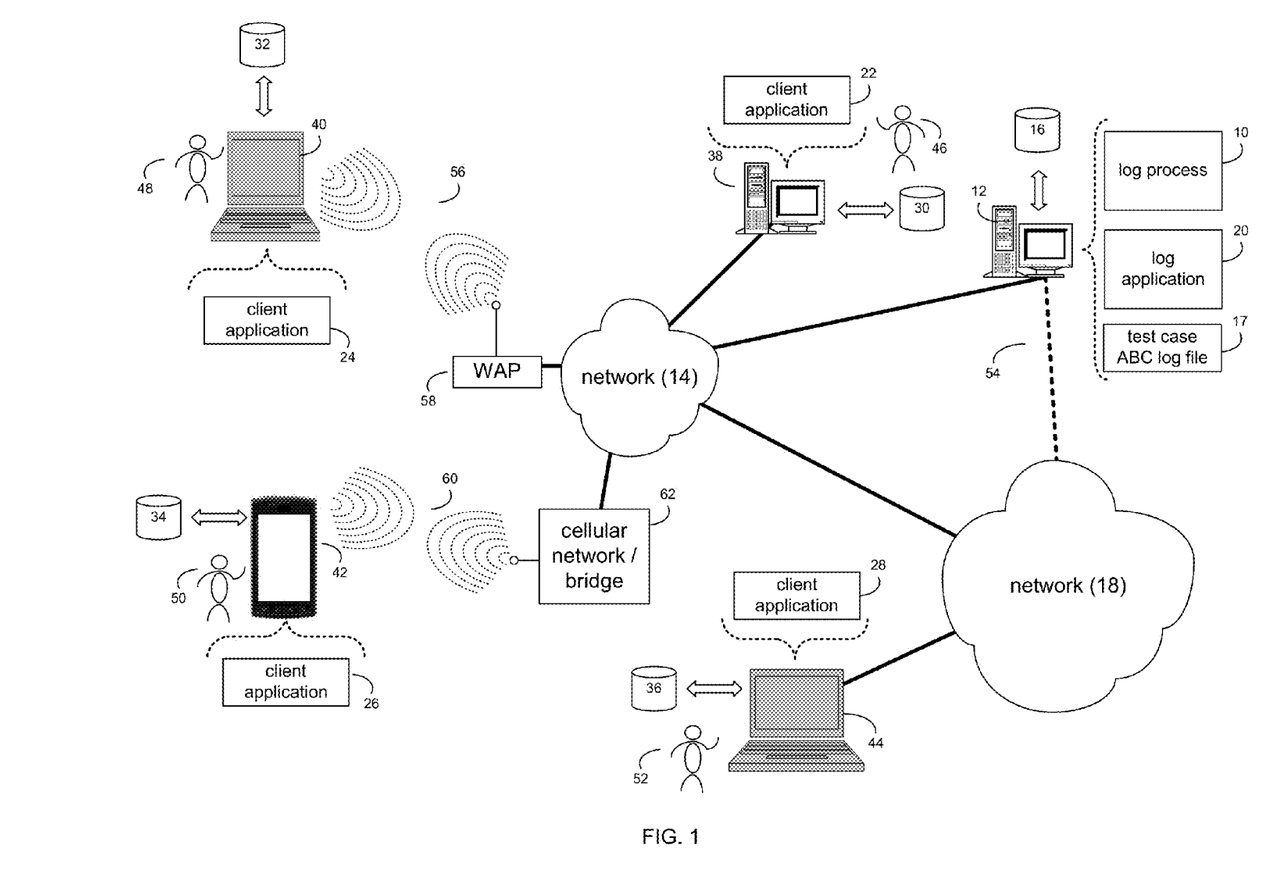
FIG. 1 is an illustrative diagrammatic view of a log process coupled to a distributed computing network according to one or more embodiments of the present disclosure.

Referring to FIG. 1, there is shown log process 10 that may reside on and may be executed by a computer (e.g., client computer 12), which may be connected to a network (e.g., network 14) (e.g., the internet or a local area network). Examples of client computer 12 may include, but are not limited to, a personal computer(s), a laptop computer(s), mobile computing device(s), a server computer, a series of server computers, a mainframe computer(s), or a computing cloud(s). Client computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, log process 10 may, e.g., via a processor, receive an initiation indication that a test is initiating on a computing device. A logging process may be activated to record to a log (e.g., test case log file 17) one or more log messages generated as a result of the test in response to receiving the initiation indication that the test is initiating. A completion indication may be received that the test is complete. The logging process may be deactivated to stop recording to the log in response to receiving the completion indication that the test is complete. The one or more log messages may be associated with the test in response to receiving the completion indication that the test is complete.

The instruction sets and subroutines of log process 10, which may be stored on storage device 16 coupled to client computer 12, may be executed by one or more processors (not shown) and one or more memory architectures (not shown) included within client computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Client computer 12 may execute an activity recording application (e.g., logging application 20), examples of which may include, but are not limited to, e.g., a web content manager application, a testing application, a server/web server logging application, a control system logging application, an operating system subsystem logging application, log library application, or other application that allows for the testing and/or logging of information. Log process 10 and/or logging application 20 may be accessed via client applications 22, 24, 26, 28. Log process 10 may be a stand alone application, or may be an applet/application/script that may interact with and/or be executed within logging application 20. Examples of client applications 22, 24, 26, 28 may include but are not limited to a web content manager application, a testing application, a server/web server logging application, a control system logging application, an operating system subsystem logging application, or other application that allows for the testing and/or logging of information, a standard and/or mobile web browser, an email client application, a textual and/or graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (e.g., smart television) (not shown), and a dedicated network device (not shown). Client electronic devices 38, 40, 42, 44 may each execute an operating system, examples of which may include but are not limited to Android™, Apple® iOS®, Microsoft® Windows®; Mac® OS X®; Red Hat® Linux®, or a custom operating system.

One or more of client applications 22, 24, 26, 28 may be configured to effectuate some or all of the functionality of log process 10 (and vice versa). Accordingly, log process 10 may be a purely server-side application, a purely client-side application, or a hybrid server-side/client-side application that is cooperatively executed by one or more of client applications 22, 24, 26, 28 and log process 10.

One or more of client applications 22, 24, 26, 28 may be configured to effectuate some or all of the functionality of logging application 20 (and vice versa). Accordingly, logging application 20 may be a purely server-side application, a purely client-side application, or a hybrid server-side/client-side application that is cooperatively executed by one or more of client applications 22, 24, 26, 28 and logging application 20.

Users 46, 48, 50, 52 may access client computer 12 and log process 10 directly through network 14 or through secondary network 18. Further, client computer 12 may be connected to network 14 through secondary network 18, as illustrated with phantom link line 54.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
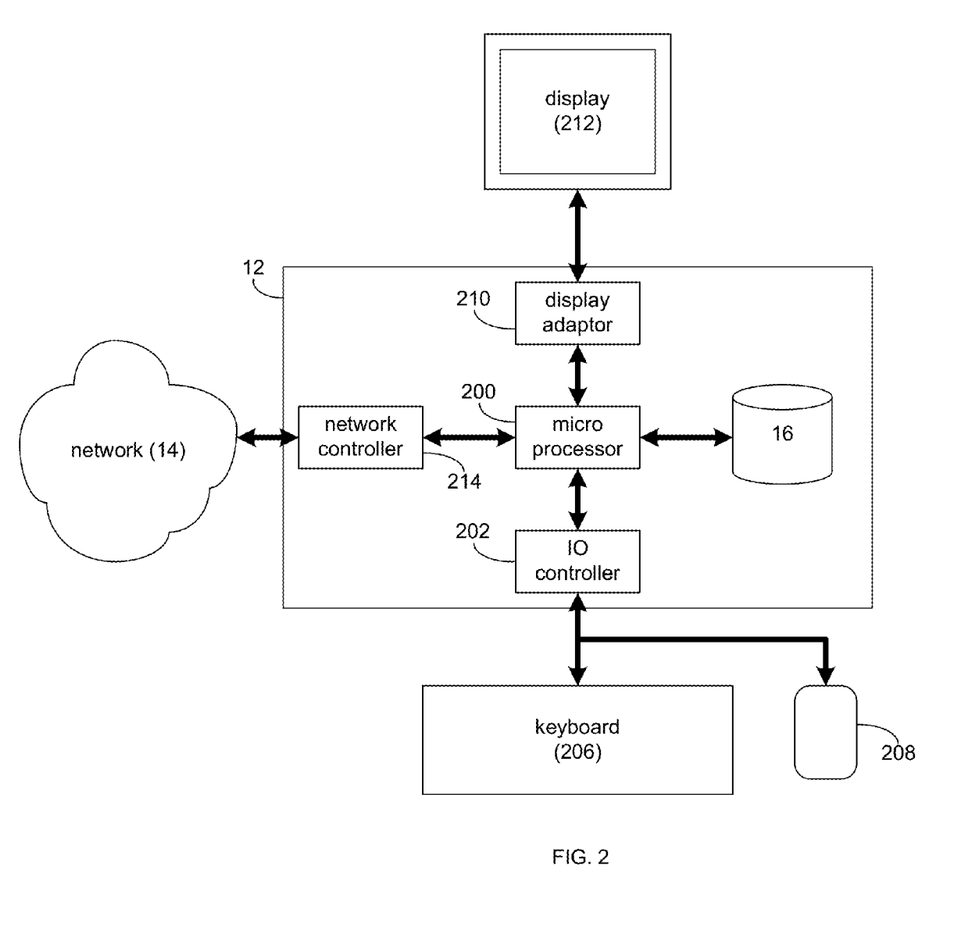
FIG. 2 is a diagrammatic view of the client computer of FIG. 1 according to one or more embodiments of the present disclosure.

Referring also to FIG. 2, there is shown a diagrammatic view of the client computer 12. While client computer 12 is shown in this figure, this is for illustrative purposes only and is not intended to be a limitation of this disclosure, as other configuration are possible. For example, any computing device capable of executing, in whole or in part, log process 10 may be substituted for client computer 12 within FIG. 2, examples of which may include but are not limited to client electronic devices 28, 30, 32, 34.

Client computer 12 may include a processor and/or microprocessor (e.g., microprocessor 200) configured to, e.g., process data and execute the above-noted code/instruction sets and subroutines of log process 10. Microprocessor 200 may be coupled via a storage adaptor (not shown) to the above-noted storage device 16. An I/O controller (e.g., I/O controller 202) may be configured to couple microprocessor 200 with various devices, such as keyboard 206, mouse 208, USB ports (not shown), and printer ports (not shown). A display adaptor (e.g., display adaptor 210) may be configured to couple display 212 (e.g., a CRT or LCD monitor) with microprocessor 200, while network controller/adaptor 214 (e.g., an Ethernet adaptor) may be configured to couple microprocessor 200 to the above-noted network 14 (e.g., the Internet or a local area network).

The Log Process:

As discussed above and referring also to FIGS. 3-5, log process 10 may, e.g., via a processor, receive 300 an initiation indication that a test is initiating on a computing device (e.g., client computer 12). For example, client electronic device 38 may, e.g., via log process 10, send a request for client computer 12 to perform one or more system tests which may include, e.g., test case ABC 400. In the example, client computer 12 may be considered the System Under Test (SUT). In response, client computer 12 may, e.g., via log application 20 and/or log process 10, initiate test case ABC 400.

Figure 3:
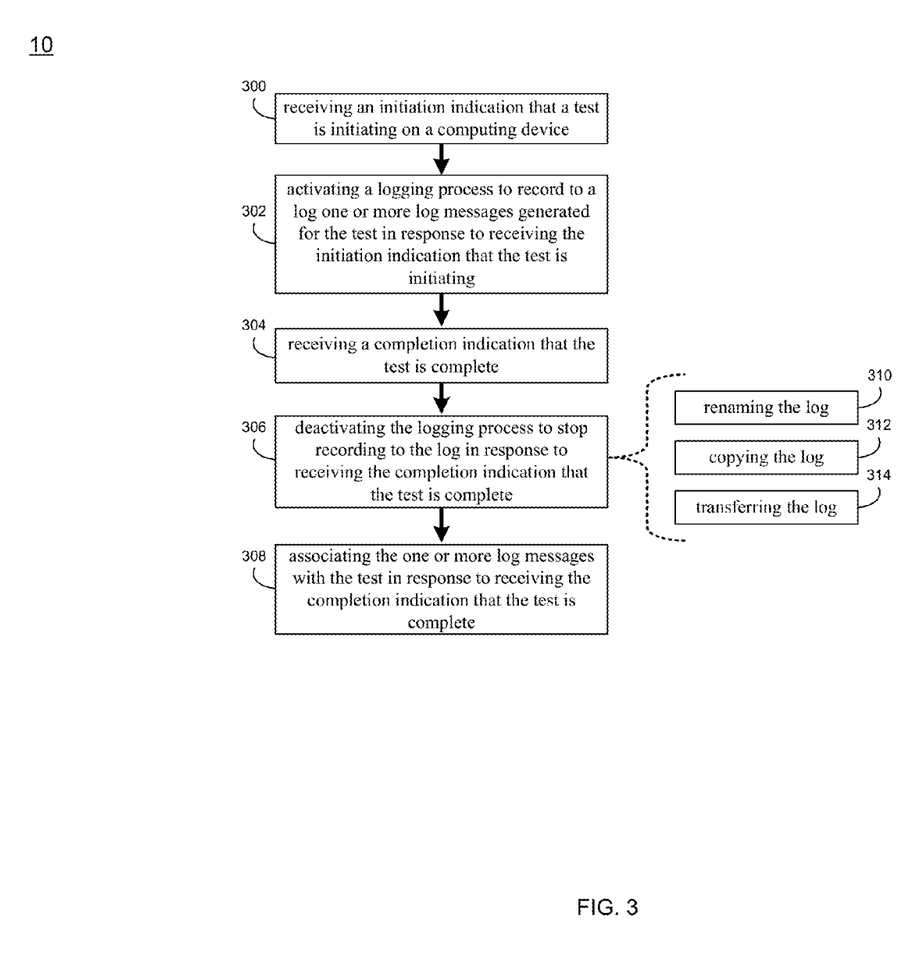
FIG. 3 is an illustrative flowchart of the log process of FIG. 1 according to one or more embodiments of the present disclosure.
Figure 4:
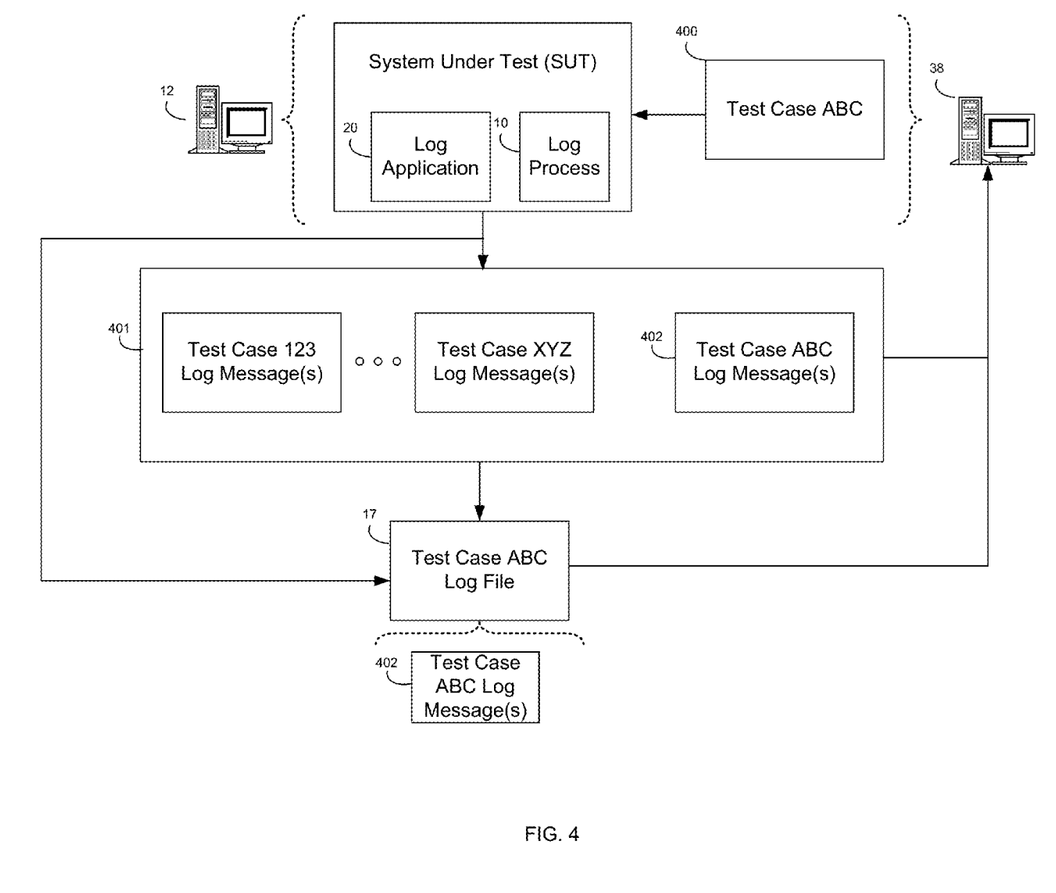
FIG. 4 is an illustrative diagrammatic view of the log process of FIG. 1 performing a test according to one or more embodiments of the present disclosure.

The request sent by client electronic device 38 to perform test case ABC 400 may be received 300 by log process 10 as the initiation indication that test case ABC 400 is initiating, however, those skilled in the art will appreciate that other types of initiation indications may be received 300 by log process 10 without departing from the scope of the present disclosure. For example, log process 10 may monitor and/or receive 300 one or more test initiation run-time calls for the specific run-time call associated with test case ABC 400. As such, the request sent by client electronic device 38 to perform test case ABC 400 as what is received 300 by log process 10 as the initiation indication should be taken as an example only and not to limit the scope of the present disclosure.

In response to receiving 300 the initiation indication that test case ABC 400 is initiating, a logging process of log application 20 may be activated 302 to record to a log (e.g., log file 401) one or more log messages (e.g., log messages 402) generated as a result of test case ABC 400. For example, as is known to those skilled in the art, logging frameworks such as, e.g., the Log 4j logging library for the Java programming language, may provide a mechanism (e.g., an appender) (e.g., in logging application 20) that may "listen" to log messages 402 being produced by client computer 12 during the execution of, e.g., test case ABC 400. In an embodiment, log application 20 may receive log messages received by an appender. Further, log application 20 may record the log message identified/received from the appender.

In some embodiments, log process 10 may include a log enablement agent (not shown), which may reside, e.g., in the same machine (e.g., virtual machine) as the SUT (e.g., client computer 12) and overall log system. The log enablement agent of log process 10 may be called, e.g., locally and/or through a remote procedure call, which may activate 302 the above-noted appender. Log process 10 (e.g., via logging application 20) may activate 302 the appender, to listen to log messages 402 being produced by client computer 12 during the execution of, e.g., test case ABC 400 and record them to log file 401. Log process 10, e.g., via the appenders, may generally record log messages 402 to the above-noted storage device 16, and may be recorded, e.g., in memory inside of the log agent and then stored in the appropriate location.

Log process 10 may receive 304 a completion indication that test case ABC 400 is complete. For example, log process 10 may receive 304 an indication from log application 20 that test case ABC 400 is complete. Those skilled in the art will appreciate that any known techniques of determining that test case ABC 400 is complete may be used by log process 10 without departing from the scope of the present disclosure. For example, log process 10 may monitor and/or receive 304 one or more test completion run-time calls in the above-noted logging facility associated with client computer 12 for the specific run-time call associated with test case ABC 400. As such, the description of an indication from application 20 that test case ABC 400 is complete as what is received 304 by log process 10 as the completion indication should be taken as an example only and not to limit the scope of the present disclosure.

In response to receiving 304 the completion indication that test case ABC 400 is complete, log process 10 may deactivate 306 the logging process to stop recording log messages 402 to log file 401 being produced by client computer 12 during the execution of, e.g., test case ABC 400. For example, above-noted log agent of log process 10 may be called, e.g., locally and/or through a remote procedure call, which may deactivate 306 the above-noted appender.

Log process 10 may associate 308 one or more of log messages 402 with test case ABC 400 in response to receiving 304 the completion indication that test case ABC 400 is complete, such that, e.g., the relevant section(s) of log file 401 may be identified specifically as having been generated as a result of a specific test (e.g., test case ABC 400) or a set of user interactions. For example, log process 10 may rename 310 at least a portion of log file 401 including the one or more messages to associate the one or more messages with the test. In an embodiment, renaming 310 at least a portion of the log file 401 may include renaming 310 the at least a portion of log file 401 to include a name that may be relatively more easily identifiable to a user (e.g., user 46) as including log messages 402 that pertain specifically to test case ABC 400, such as, e.g., "TestCaseABCLogFile.LOG". In the example, when, e.g., diagnosing an error, developers and testers, may relatively quickly and easily open test case ABC log file 17 to identify log messages 402 that pertain specifically to test case ABC and quickly start the debugging the issue. In some embodiments, log file 401 and/or test case ABC log file 17 may also be attached by log process 10 to, e.g., a defect record, to assist with problem identification and/or debugging.

In some embodiments, only the log messages generated as a result of test case ABC 400 (i.e., log messages 402 that pertain specifically to test case ABC 400) may be renamed 310 to test case ABC log file 17. For example, log file 401 may be, e.g., a raw log file that may include log messages pertaining to multiple tests (not just those log messages pertaining to test case ABC 400). For instance, log file 401 in the example may contain log messages pertaining to test case 123, log messages pertaining to test case XYZ, and log messages 402 pertaining to test case ABC. In an embodiment, after log process 10 renames 310 log file 401 to test case ABC log file 17, test case ABC log file 17 in the example may only contain log messages 402 that pertain specifically to test case ABC 400 and may not contain any other log messages that pertain to different tests.

Additionally/alternatively, only the log messages generated as a result of test case ABC 400 (i.e., log messages 402 that pertain specifically to test case ABC 400) may be recorded to log file 401. For example, log process 10 and/or log application 20 may generate a separate log file for each test case before or after beginning to record the log messages that pertain specifically to each respective test case. For instance, log process 10 in the example may generate test case ABC log file 17 before or after beginning to record log messages 402 that pertain specifically to test case ABC 400, may generate another separate test case 123 log file before or after beginning to record the log messages that pertain specifically to test case 123, and may generate another separate test case XYZ log file before or after beginning to record the log messages that pertain specifically to test case XYZ. This may obviate log process 10, e.g., renaming 310 log file 401, to associate 308 log messages 402 with test case ABC 400, as discussed above.

In some embodiments, as another example, log process 10 may copy 312 at least a portion of log file 401, e.g., to a storage location (or file) for log messages 402 that pertain specifically to test case ABC 400. In some embodiments, the storage location may include a storage location that may be relatively more easily identifiable by a user (e.g., user 48). For example, log process 10 may copy 312 log file 401 to a storage location on storage device 30 at, e.g., "F:/Log/TestCaseABC". Additionally/alternatively, log process 10 may copy 312 only log messages 402 that pertain specifically to test case ABC 400 from log file 401 to a storage location on storage device 30 at, e.g., "F:/Log/TestCase/ABC".

Additionally/alternatively, only the log messages generated as a result of test case ABC 400 (i.e., log messages 402 that pertain specifically to test case ABC 400) may be copied 312 to "F:/Log/TestCaseABC". That is, after log process 10 copies 312 log file 401 to "F:/Log/TestCaseABC", "F:/Log/TestCaseABC" may only contain log messages 402 that pertain specifically to test case ABC 400 and may not contain any other log messages that pertain to different tests (e.g., test case 123 or test case XYZ).

In some embodiments, as another example, log process 10 may transfer 314 at least a portion of log file 401, e.g., to a storage location on storage device 16 on client computer 12 and/or to a storage location on storage device 30 at client electronic device 308. In an embodiment, the storage location to which the at least a portion of log file 401 is transferred 314 may include a storage location that may be relatively more easily identify to user 48 log messages 402 that pertain specifically to test case ABC 400. For example, log process 10 may transfer 314 log file 401 to a storage location, e.g., "ClientElectronicDevice38/F:/Log/TestCaseABC". Additionally/alternatively, log process 10 may transfer 314 only log messages 402 that pertain specifically to test case ABC 400 from log file 401 to a storage location on storage device 30 at client electronic device 38 named, e.g., "ClientElectronicDevice38/F:/Log/TestCase/ABC".

Additionally/alternatively, only the log messages generated as a result of test case ABC 400 (i.e., log messages 402 that pertain specifically to test case ABC 400) may be transferred 314 to "ClientElectronicDevice38/F:/Log/TestCaseABC". That is, after log process 10 transfers 314 log file 401 to "ClientElectronicDevice38/F:/Log/TestCaseABC", "ClientElectronicDevice38/F:/Log/TestCaseABC" may only contain log messages 402 that pertain specifically to test case ABC 400 and may not contain any other log messages that pertain to different tests.

Figure 5:
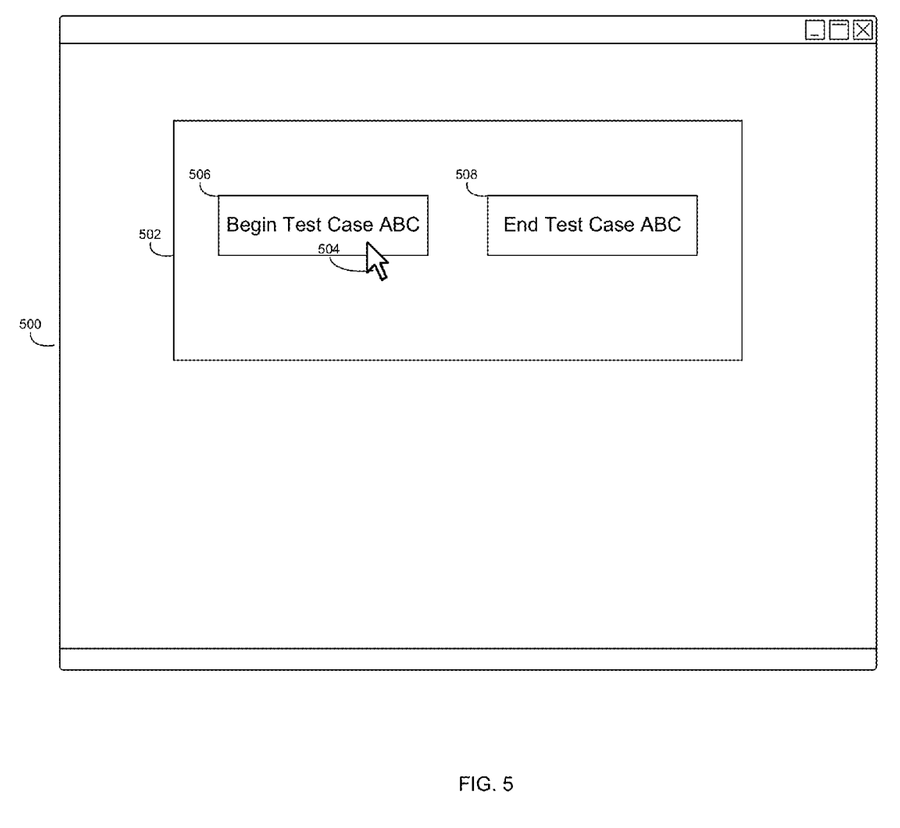
FIG. 5 is an illustrative diagrammatic view of browser plugin in conjunction with a screen image displayed by the log process of FIG. 1 according to one or more embodiments of the present disclosure.
Figure 6:
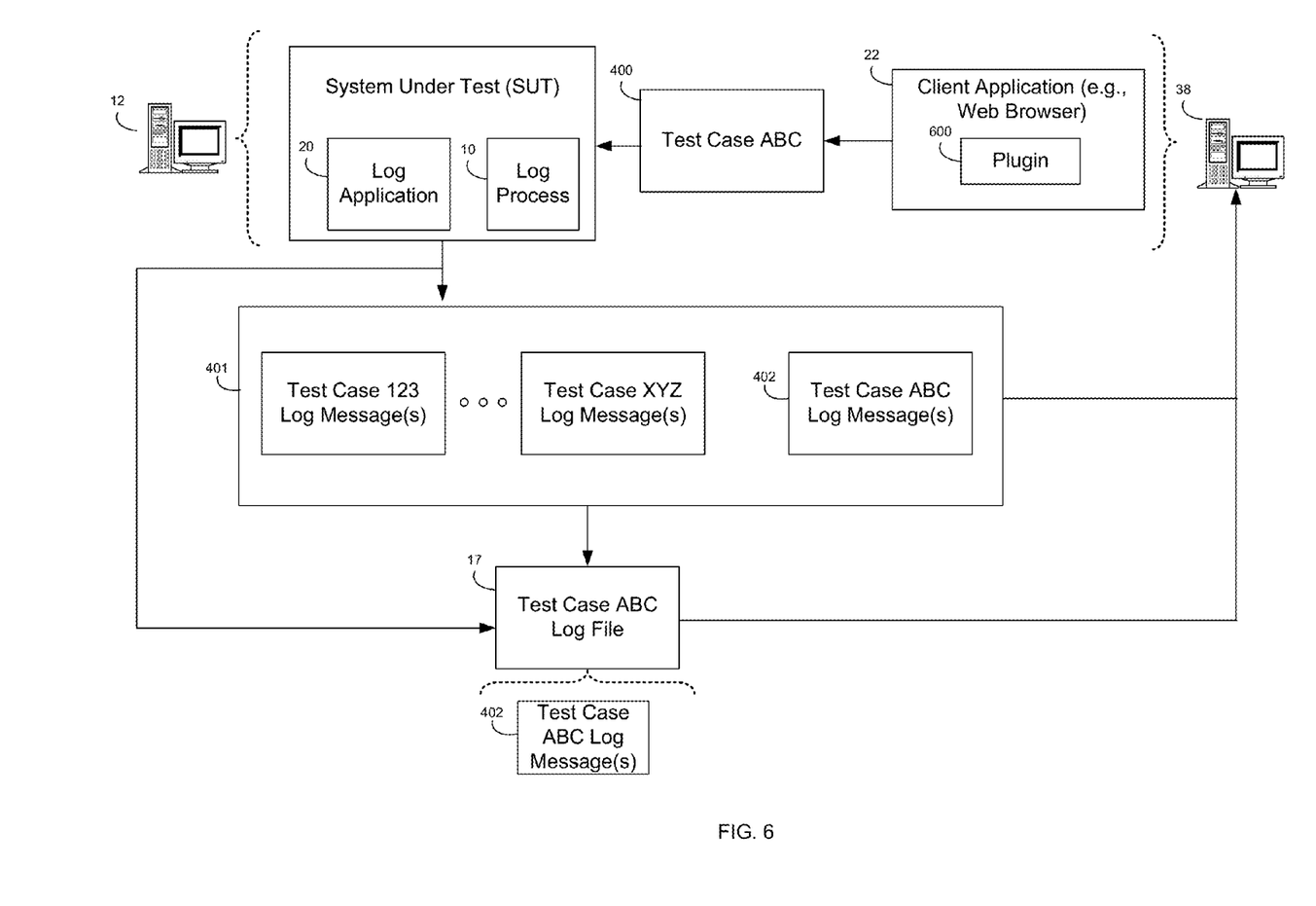
FIG. 6 is an illustrative diagrammatic view of the log process of FIG. 1 performing a test according to one or more embodiments of the present disclosure.

In some embodiments, log process 10 may be an automated process; however, log process 10 may also be a manual process, which may be beneficial for, e.g., exploratory testing and for reproducing errors. For example, as noted above, log process 10 may be part of and/or interact with client application 22 (e.g., a web browser) on client electronic device 38. In the example, the appender for the logging process of log process 10 may be activated 302 and/or deactivated 306 by a plugin (e.g., browser plugin 600) of the web browser. For instance, log process 10 may render an interface 500 in the web browser, which may include a window (e.g., window 502). Window 502 may be, e.g., a separate window or may be a pop-up window. Log process 10 may enable user 48 to select a first selectable option 506 in window 502 to begin test case ABC. Log process 10 may enable user 48 to select the first selectable option 506 via "pointer" 504 or other technique.

In the example, after user 48 selects the first selectable option 506, browser plugin 600 may send a request to log process 10 and/or log application 20 on client computer 12 to initiate test case ABC. In response to log process 10 and/or log application 20 receiving 300 the initiation request from browser plugin 600, log process 10 and/or log application 20 may activate 302 the appender to record log messages 402 to log file 401 and/or test case ABC log file 17 as discussed above.

Log process 10 may, via "pointer" 504 or other technique, enable user 48 to select a second selectable option 508 in window 502 to end test case ABC. In the example, after user 48 selects the second selectable option 508, browser plugin 600 may send a request to log process 10 and/or log application 20 on client computer 12 to end test case ABC. In response to log process 10 and/or log application 20 receiving 304 the end request from browser plugin 600, log process 10 and/or log application 20 may deactivate 306 the appender to stop recording log messages 402 to log file 401 and/or test case ABC log file 17 as discussed above. In response to log process 10 and/or log application 20 receiving 304 the end request from browser plugin 600, log process 10 may associate 308 log messages 402 with test case ABC 400 as discussed above. Log process 10 may enable browser plugin 600 to communicate with client computer 12 to have log process 10 and/or log application 20 retrieve log file 401 and/or test case ABC log file 17 for user 48.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   receiving, by a processor, an initiation indication that a test is initiating on a computing device;
   activating a logging process to record to a log one or more log messages generated as a result of the test in response to receiving the initiation indication that the test is initiating;
   receiving a completion indication that the test is complete;
   deactivating the logging process to stop recording to the log in response to receiving the completion indication that the test is complete; and
   associating the one or more log messages with the test in response to receiving the completion indication that the test is complete.

2. The computer-implemented method of claim 1 wherein associating the one or more log messages with the test includes renaming the log.

3. The computer-implemented method of claim 1 wherein associating the one or more log messages with the test includes copying the log.

4. The computer-implemented method of claim 1 wherein associating the one or more log messages with the test includes transferring the log.

5. The computer-implemented method of claim 1 wherein only the one or more log messages generated as a result of the test are recorded to the log.

6. The computer-implemented method of claim 1 wherein the logging process is one or more of activated and deactivated by a plugin.

7. The computer-implemented method of claim 6 wherein the plugin includes a browser plugin.

8. A computer program product residing on a computer readable storage medium having a plurality of instructions stored thereon which, when executed by a processor, cause the processor to perform operations comprising:
   receiving an initiation indication that a test is initiating on a computing device;
   activating a logging process to record to a log one or more log messages generated as a result of the test in response to receiving the initiation indication that the test is initiating;
   receiving a completion indication that the test is complete;
   deactivating the logging process to stop recording to the log in response to receiving the completion indication that the test is complete; and
   associating the one or more log messages with the test in response to receiving the completion indication that the test is complete.

9. The computer program product of claim 8 wherein associating the one or more log messages with the test includes renaming the log.

10. The computer program product of claim 8 wherein associating the one or more log messages with the test includes copying the log.

11. The computer program product of claim 8 wherein associating the one or more log messages with the test includes transferring the log.

12. The computer program product of claim 8 wherein only the one or more log messages generated as a result of the test are recorded to the log.

13. The computer program product of claim 8 wherein the logging process is one or more of activated and deactivated by a plugin.

14. The computer program product of claim 13 wherein the plugin includes a browser plugin.

15. A computing system including a processor and memory configured to perform operations comprising:
   receiving an initiation indication that a test is initiating on a computing device;
   activating a logging process to record to a log one or more log messages generated as a result of the test in response to receiving the initiation indication that the test is initiating;
   receiving a completion indication that the test is complete;
   deactivating the logging process to stop recording to the log in response to receiving the completion indication that the test is complete; and
   associating the one or more log messages with the test in response to receiving the completion indication that the test is complete.

16. The computing system of claim 15 wherein associating the one or more log messages with the test includes renaming the log.

17. The computing system of claim 15 wherein associating the one or more log messages with the test includes copying the log.

18. The computing system of claim 15 wherein associating the one or more log messages with the test includes transferring the log.

19. The computing system of claim 15 wherein only the one or more log messages generated as a result of the test are recorded to the log.

20. The computing system of claim 15 wherein the logging process is one or more of activated and deactivated by a plugin.

21. The computing system of claim 20 wherein the plugin includes a browser plugin.

* * * * *